United States Patent [19]

Lavallee et al.

[11] Patent Number: 5,524,474

[45] Date of Patent: Jun. 11, 1996

[54] METHOD AND APPARATUS FOR QUANTITATIVELY EVALUATING THE STATOR WEDGE TIGHTNESS OF AN ELECTRIC ALTERNATOR

[75] Inventors: Jean Lavallee, Longueuil; Pierre Lavigne, Boucherville; Pascale Rondot, Montreal; Léon Veronneau, St-Lambert; Patrick Mongenot, Outremont, all of Canada

[73] Assignee: Hydro-Quebec, Montreal, Canada

[21] Appl. No.: 337,397

[22] Filed: Nov. 8, 1994

[51] Int. Cl.$^6$ .................................................. G01M 7/00
[52] U.S. Cl. ........................................................ 73/12.09
[58] Field of Search ............................. 73/12.01, 12.09, 73/12.11, 865.9; 33/DIG. 13

[56] References Cited

U.S. PATENT DOCUMENTS

| | | | |
|---|---|---|---|
| 2,442,938 | 6/1948 | Ruge | 33/DIG. 13 |
| 4,172,388 | 10/1979 | Gabrielson | 73/721 |
| 5,012,684 | 5/1991 | Humphries | 73/865.8 |
| 5,020,234 | 6/1991 | Alkire et al. | 33/656 |

FOREIGN PATENT DOCUMENTS

| | | |
|---|---|---|
| 3437555 | 5/1985 | Germany. |
| 3442389 | 6/1985 | Germany. |
| 3438468 | 6/1985 | Germany. |
| 3521476 | 1/1986 | Germany. |

OTHER PUBLICATIONS

Huttner et al., "Quelques aspects des methods de diagnostic et de surveillance en exploitation", CIGRE, (1986), pp. 1–7.
V. I. Neeley, "Stater–coil Wedge–Tightness Detector—Final Report", EPRI–EL–3358, Electric Power Research Institute, Feb. 1984.
ELIN, "Radial Slot Wedge Movement", (6–1 to 6–3), (1986).

Primary Examiner—Robert Raevis
Attorney, Agent, or Firm—Foley & Lardner

[57] ABSTRACT

Disclosed is a method for quantitatively evaluating the tightness of the stator wedges of an alternator, which can be reduced to practice without having to remove or dismantle the rotor of the alternator even when the air-gap of the alternator is as small as 10 mm, and which permits to obtain a quantitative evaluation of the compression percentage of the ripple spring holding the wedges in a simple, efficient and reliable manner. This method makes use of a thin flat sensor having one face provided with a recess in which a piston is mounted. This sensor is inserted into the air-gap of the alternator and positioned in front of the stator wedge to be evaluated so that the piston faces this wedge. Thus, a fluid is injected into the sensor to bring the piston to contact and then press against the wedge while the sensor is backed against the rotor. The pressure of the injected fluid which is proportional to the force applied to the ripple spring, is measured together with the displacement of the stator wedge while the pressure is exerted and the so-measured force and displacement are used to determine the tightness of the wedge. The above mentioned measurement of the displacement of the wedge is achieved by measuring the displacement of the piston in its cylinder by means of strain gauge fixed onto resilient blades bearing against the piston. An apparatus for carrying out this method is also disclosed.

24 Claims, 6 Drawing Sheets

FIG. 7
RESULTING DISPLACEMENT AT A CONSTANT FORCE

METHOD AND APPARATUS FOR QUANTITATIVELY EVALUATING THE STATOR WEDGE TIGHTNESS OF AN ELECTRIC ALTERNATOR

BACKGROUND OF THE INVENTION a) Field of The Invention

The present invention relates to a method for quantitatively evaluating the tightness of the stator wedges of a large alternator. The invention also relates to an apparatus for carrying out this method.

In the following specification, the term "alternator" as it is used, designates any kind of hydroalternators and turboalternators, having either a vertical or a horizontal axis.

b) Brief Description of The Prior Art

As is commonly known, an alternator comprises a rotor and a stator defining an air-gap of a given width therebetween. In practice, the stator usually consists of superimposed metal plates in which are provided radial slots having outlets opening into tile air-gap. In each of these slots, at least one and preferably two stator coils are held by resilient holding means which may consist of a rubber bead or of a ripple spring which itself may consist of a long strip of composite material that is undulated either lengthwisely or transversally. The resilient holding means abuts, either directly or by the intermediary of a packing material and/or quoins, against a set of small stator wedges a few centimeters long, that are slidably inserted and retained in a set of symmetric grooves provided for such purpose in the metal plates of the stator, at the outlet of the corresponding slot. In large alternators like those powered by the turbines of a dam, there is a great number of these wedges, which are preferably made of composite material of the fiberglass type. Indeed, in large alternators, the stator can have as many as 500 slots along its periphery and each of them may be several meters high.

It is known that one of the main causes of forced interruptions of use of the alternators used in the hydroelectric power stations is due to defects in the stator coil windings, which are in turn due to vibrations of the stator coils. The vibrations may be caused by improper mounting of the wedges in their grooves or if the resilient holding means mounted between these wedges and the stator coils, lose some tightness in use. In such cases, there is indeed premature wear and a consequent major risk of short circuits. Therefore, it is a standard procedure to verify at regular intervals whether the stator coils are properly wedged.

The method currently employed for evaluating the stator wedge tightness condition of an alternator, i.e. detecting that the stator coils are properly wedged in place, consist of hitting with a hammer each of the stator wedges and detect by the sound produced whether the wedges are properly held in theft grooves by the pressure exerted by the resilient holding means located behind them. This method is simple and efficient but has two major drawbacks. Firstly, it calls for the rotor to be partially or completely dismantled so that an operator can effectuate the required hitting. Such can only be done on some important occasions. Secondly, this method is purely subjective, since the determination of the degree of "tightness" of the wedges according to the sound produced by the same is left entirely to the judgement of the operator who, well trained as he or she may be, may still make a mistake.

To tentatively obviate these two drawbacks, it has been proposed by ELIN-UNION A.G. or Austria, to hit the stator wedges without removing the rotor, by means of a microhammer that can be inserted into an air-gap wider than 10 mm. The sound produced by this hitting is recorded with a microphone and may thence be evaluated by an operator using headphones or by a computerized electronic sound analysis system. A similar method is also suggested in U.S. Pat. No. 4,970,890 issued on Nov. 20, 1990 to WESTING-HOUSE ELECTRIC CORPORATION.

In German laid-open patent application n° DE-A-3,438, 468 published on Jun. 20, 1985, ELIN-UNION A.G. has also disclosed another method for evaluating the tightness of the stator wedges of an alternator without having to remove the rotor, which consists in verifying the stator wedge tightness of the resilient holding means holding the wedges in place, with a sensor having a thickness inferior to the width of the air-gap, the sensor including a mobile element actuable remotely by means of wedge-shaped members located at the extremities of a piston which is operated by a hydraulic fluid. In use, the sensor is inserted into the air-gap and placed in front of the wedge where an evaluation is to be performed, so that the mobile element of the sensor faces the wedge. The piston is then actuated and tile pressure "P" of the injected fluid is measured simultaneously with the longitudinal displacement of the piston which, thanks to the wedge-shaped members, causes a simultaneous transversal displacement of the sensor, whose value "L" of which is easily calculable. The curve giving the pressure "P" as a function of the displacement "L" that is thus obtained makes it possible to evaluate the stator wedge tightness of the resilient holding means.

Although this method is very efficient, it is, according to its manufacturer, usable only in air-gaps of a width greater than 20 mm. Moreover, such method is difficult to apply to large alternators, since it does not seem to provide means to properly position the sensor and its mobile element in front of each wedge to be verified.

A similar method has been proposed in U.S. Pat. No. 5,012,684 issued on May 7, 1991 to WESTINGHOUSE ELECTRIC CORPORATION. In this patent, there is disclosed a method for evaluating the stator wedge tightness of an alternator using a sensor especially designed to measure the elasticity of the rubber bead or ripple spring holding the wedges, by measuring the displacement of this rubber bead or ripple spring as a function of the exerted pressure. In this particular case, the radial slots of the stator in which are located the stator coils must be provided with two sets of grooves: one for the stator wedges and another one in which the sensor can be inserted. Such construction renders the sensor useless unless the alternator is of the above type.

WESTINGHOUSE ELECTRIC CORPORATION has also proposed another kind of sensor insertable in the air-gap of an alternator to measure the deflection of the ripple springs holding the stator wedges. The sensor which forms the subject matter of U.S. Pat. No. 5,020,234 issued on Jun. 4, 1991 is very complicated from a structural standpoint. Moreover, even if an extra set of grooves is not required, the wedges must be provided with perforations, since the sensor is devised to measure the deflection of the ripple springs by contacting the same with a rod which must be aligned with the selected perforation using a miniature television camera to do so.

OBJECT AND SUMMARY OF THE INVENTION

A first object of the present invention is to provide a method for quantitatively evaluating the tightness of the stator wedges of an alternator, which method has the major advantage of not suffering from any of the limitations of the known methods discussed hereinabove.

A second object of the invention is to provide an apparatus for carrying out this method. More precisely, the first object of the invention is to provide a method for evaluating the tightness of the stator wedges of an alternator, which has the following advantages thanks to the use of a new sensor especially devised for this purpose, which is very simple, thin and efficient:

it utilizes very simple structural means;

it can be reduced to practice without having to remove or dismantle the rotor of the alternator;

it can be reduced to practice in any kind of alternator, even when the air-gap of the latter has a width as thin as 10 mm;

it permits to obtain a quantitative evaluation of the equivalent compression percentage of the resilient holding means in a simple, efficient reproducible and reliable manner;

it may be automated.

As is the case for all the methods previously discussed, the method according to the invention is intended to be used for quantitatively evaluating the stator wedges tightness of an alternator comprising a rotor and a stator defining together an air-gap of a given width, the stator being provided with radial slots having outlets in open communication with the air-gap, and in each of which is held at least one stator coil by means of resilient holding means like a rubber bead or a ripple spring, that abut wedges slidably inserted in a symmetrical set of grooves provided for this purpose in the stator at the outlet of each slot.

As in the method described in German laid open patent application n° DE-A- 3,438,468, the method according to the invention is of the type comprising the steps of:

(a) inserting into the air-gap a sensor provided with a mobile element capable of being displaced in a direction transverse to this air-gap by a fluid subjected to pressure;

(b) positioning the sensor in front of the stator wedge the tightness of which is to be evaluated, in such a manner that the mobile element of this sensor faces the wedge;

(c) exerting a pressure on the fluid to displace the mobile element of the sensor and to bring this element to contact and then press against the wedge while the sensor is backed against the rotor;

(d) measuring the so-exerted pressure, this pressure being proportional to the force applied to the resilient holding means behind the stator wedge;

(e) measuring the displacement of the stator wedge as the pressure is exerted; and (f) determining the tightness of the stator wedge by using the so measured force and displacement to do so. However, the method according to the invention distinguishes over the above mentioned known method in that:

(g) the sensor that is used, has a body in the form of a thin flat plate having a thickness slightly smaller than the width of the air-gap, this body having one face provided with a recess acting as a cylinder in which is mounted a piston acting as the mobile element mentioned above, such piston being remotely actuable by injection of the pressurized fluid into the cylinder; and (h) the measurement of the displacement of the wedge is achieved by measuring the displacement of the piston in its cylinder by means of at least one and preferably two resilient blades each having a first extremity rigidly fixed to the one face of the sensor, a second extremity mounted on the piston so as to be displaced with the latter, and a central portion on which is attached at least one and preferably two or four strain gauges giving a signal proportional to the displacement of the piston and thence to the displacement of the stator wedge when the latter is pressed.

From a practical stand-point, the determination of the tightness of the stator wedges can be obtained by a first method which can be carried out in two different ways, i.e.:

1) by exerting a constant pressure and measuring the displacement that is then obtained; or 2) by setting a given displacement for the stator wedge and measuring the force required to achieve such displacement.

Before doing so, it may be particularly useful to proceed to a suitable calibration of the sensor by measuring in lab the force to be exerted as a function of the displacement to be obtained for the type of resilient holding means to be tested at different initial levels of compression. A calibration curve giving the displacement produced by a given force "F", or the force required to obtained a given displacement "D" as a function of the initial level of compression, may thus be drawn. The expression "initial level of compression" as used in the present specification designates the ratio of the actual compression of the resilient holding means when it has been installed, to the maximum compression that such means can be given, expressed as a percentage. Thus, in the case where the resilient holding means is a spring, this initial level of compression is the ratio, expressed as a percentage, of the actual stroke of the spring expressed in a given length unit when it has just been installed, to the full stroke that such spring will have when it is fully compressed. The level of compression, (or tightness) of each wedge under test may then be derived directly from the measurement of the displacement produced by a given force "F" applied to the wedge, or from the measurement of the force required to displace the wedge over a given length "D" using the calibration curves to do so.

The evaluation of the tightness of the stator wedges may also be obtained by a second method consisting in evaluating the ordinate at the origin of the curves giving the force as a function of the displacement. Such corresponds to the actual force applied by the resilient holding means on the stator wedge. In such case, the initial ordinate can be obtained by computer processing of the curves.

If need be, one may proceed to a comparative analysis of the curves giving the force as a function of the displacement of new and used resilient holding means, respectively, to obtain an indication of the mechanical state of the resilient holding means to be evaluated at the time of measurement.

As indicated hereinabove, the sensor used for carrying out the invention is provided with a miniature piston and a set of resilient blades. The structure of this sensor allows it to be as thin as 10 mm, which makes it usable in the air-gaps of most of the existing alternators. The measurement of the force is carried out with a fluid pressure sensor and the measurement of the displacement is carried out with the resilient blades which are provided with strain gauges that directly measure their bending, i.e. the displacement of the piston. The apparatus incorporating this sensor can be completed by a console including a control, module, a data acquisition module, an analysis module and a video screen.

An automated positioning system can also be provided to automatically displace and position the sensor from one wedge to another and from one groove to another. A camera can further be provided to facilitate the positioning of the sensor when the latter is used manually and to allow a visual inspection of the ventilation apertures and of the surface of the core of the stator, as well as a verification of the piston, wedge and blades of the sensor when this is desired.

As indicated above, the second object of the invention is to provide an apparatus specially designed to carry out the method described above. This apparatus will be described in great detail hereinafter.

The invention and its numerous advantages will be better understood upon reading of the following, nonrestrictive description of a preferred embodiment thereof, given with reference to the accompanying drawings.

BRIEF DESCRIPTION OF THE DRAWINGS

FIG. 4b is a cross-sectional view of the sensor, taken along line IV—IV of FIG. 4a;

DESCRIPTION OF A PREFERRED EMBODIMENT OF THE INVENTION

As explained hereinabove, the method and apparatus according to the invention are intended to be used for quantitatively evaluating the stator wedge tightness of an alternator comprising a rotor 1 and a stator 3 which together define an air-gap 5 of a given width (see FIGS. 1 and 2). The stator 3 is provided with radial slots 7 having outlets which open out to the air-gap 5, and in each of which are retained one or two stator coils 9 by means of a resilient holding means that may consist of beads made of rubber or other similar material, or of ripple springs made of composite material, that are undulated either lengthwisely or transversely. In the accompanying drawings and following description, the illustrated resilient holding means exclusively consist of a lengthwisely undulated ripple spring 11 that abuts against stator wedges 13 of trapezoidal cross-section slidably inserted into a set of grooves 15 symmetrically provided for such purpose in the stator at the outlet of each slot 7. It must however be understood that the invention is not restricted to the very specific kind of ripple spring that is illustrated.

Thus, in the illustrated embodiment, the ripple spring 11 consists of an elongated leaf of composite material, which is undulated abuts either directly or by the intermediary of a length of packing material 17 and a plurality of quoins 19, both on the adjacent stator coil 9 and on the stator wedges 13 which are themselves also made of composite material.

Figure 1:
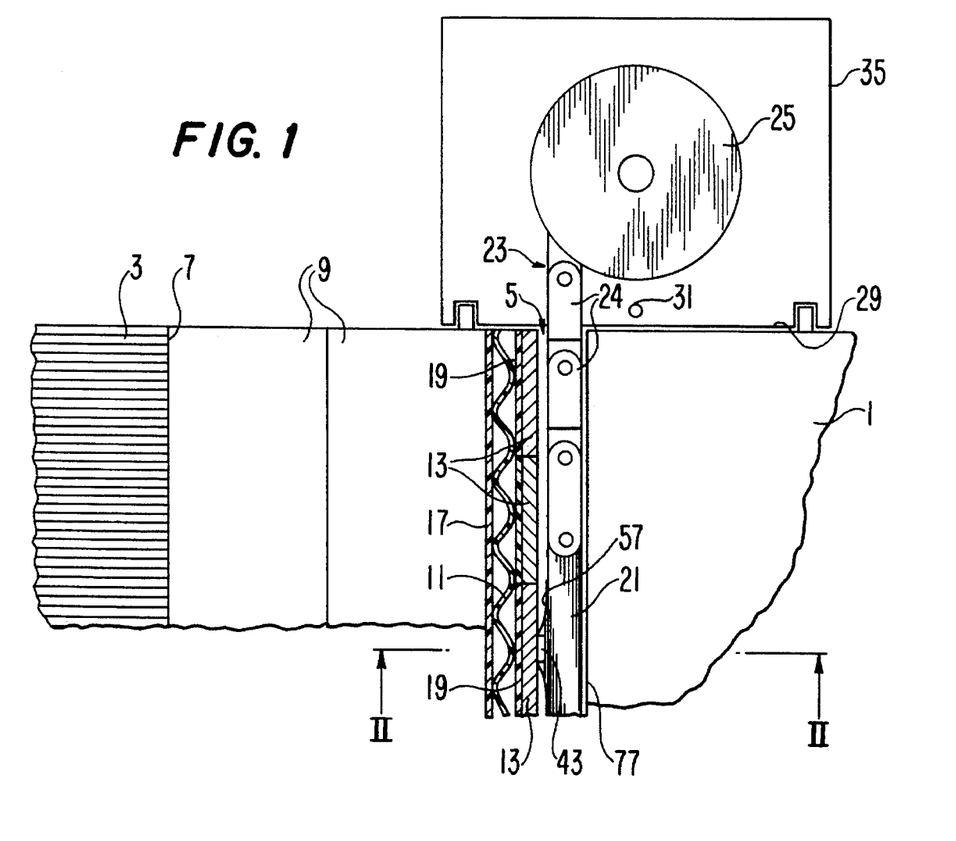
FIG. 1 is a schematic, partially cross-sectioned side view of an apparatus according to the invention for evaluating the stator wedge tightness, the apparatus being shown in use position, with the sensor inserted into the air-gap of an alternator in front of a stator wedge of which the compression percentage is to be determined.
Figure 3:
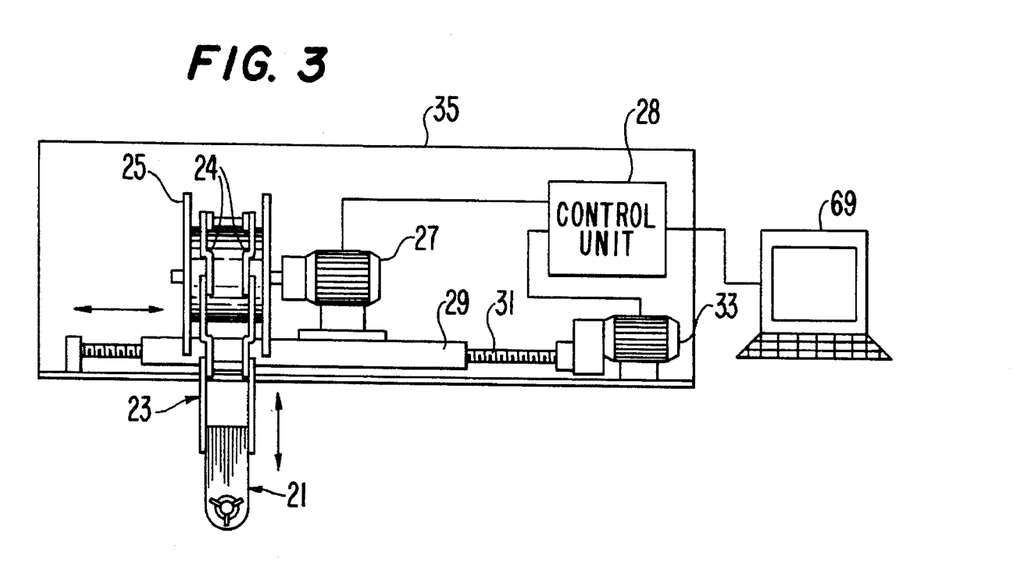
FIG. 3 is a front elevational view of the apparatus of FIG. 1.

As is more clearly illustrated in FIGS. 1 and 3, the apparatus according to the invention comprises a sensor 21 so dimensioned as to be insertable into the air-gap 5. The structure of this sensor is an essential element of the invention, and will be described in detail hereinafter.

The apparatus also comprises means to position the sensor in front of each stator wedge 13 where a tightness evaluation is required. These means preferably include a first mechanical system adapted to move the sensor 21 along each radial slot 7 and a second mechanical system adapted to move the sensor from one such slot to one or more adjacent slots.

As is shown, the first one of these two mechanical systems includes a chain 23 comprising links 24 which pivot about only one axis relative to the others. The chain 23 is wound around a drum 25 and has a free end extendable by unwinding into the air-gap and to which the sensor 21 is fixed. The drum is driven, either manually or electrically, by a motor 27 which can be connected to an appropriate control system, in order to automatically displace the sensor along each radial slot 7 such that the sensor 21 is positioned in front of each successive stator wedge 13 slidingly inserted into the grooves 15 of the slot.

The second one of the two mechanical systems mentioned hereinabove includes a carriage 29 on which the first mechanical system is mounted, and means such as an endless screw 31 actuable by an electric motor 33 to move the carriage in translation. The motor 33 may also be connected to the control system 28 to ensure automatic displacement of the device from one slot 7 to one or several other adjacent slots.

These mechanical systems are simple and take little room. They may be mounted in a casing 35 transportable like a kit and designed to be easily installed with electromagnets on an alternator, just above the area of the air-gap where the tightness of the stator wedges is to be evaluated. When such is possible, the casing may advantageously be mounted on the rotor of the alternator so as to be rotatable therewith and thus to move along all the periphery of the stator to be inspected.

Figure 2:
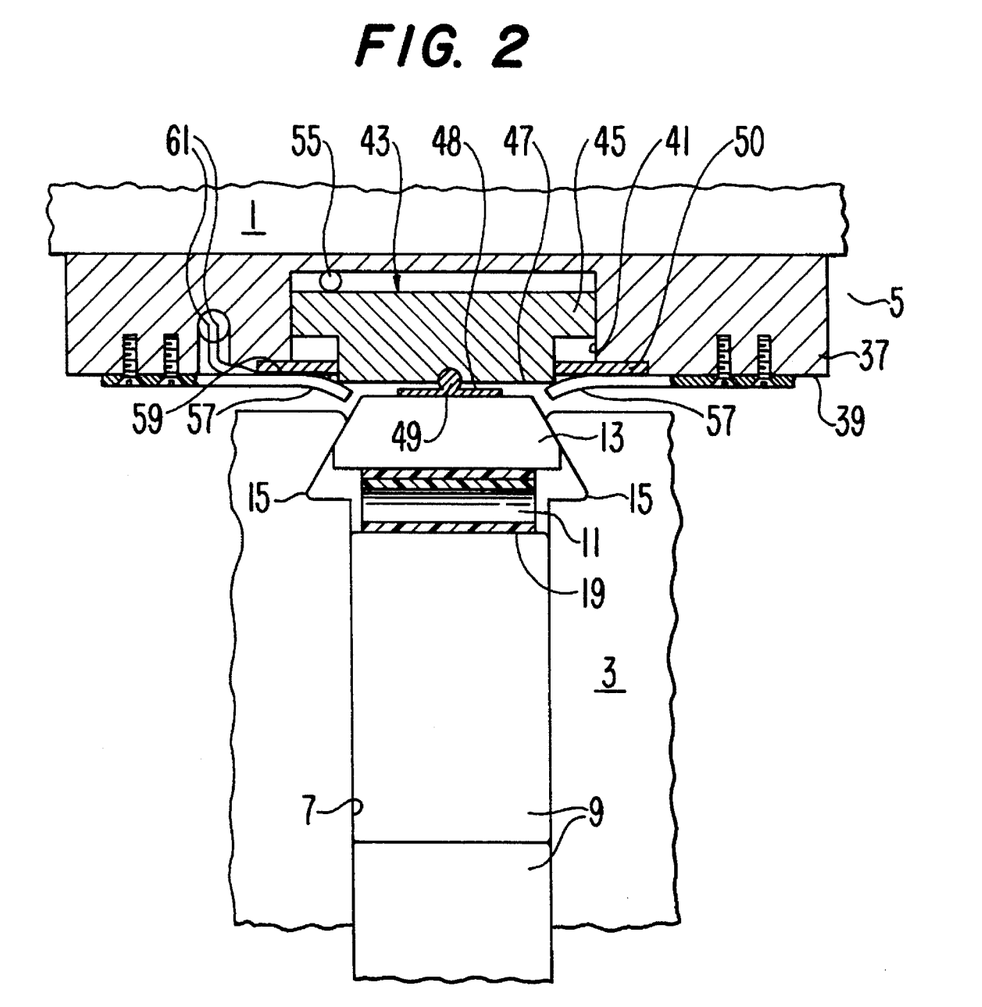
FIG. 2 is a cross-sectional view taken along lines II—II of FIG. 1.
Figure 4A:
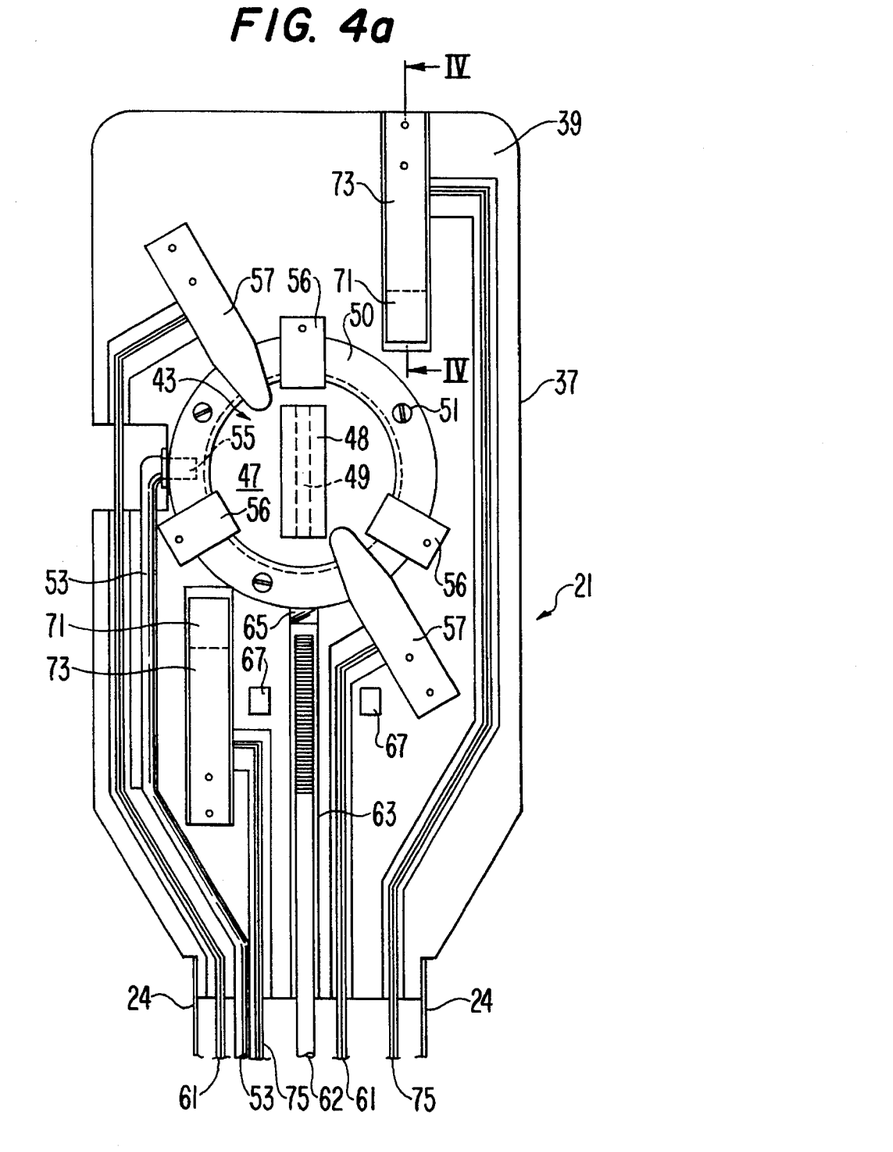
FIG. 4a is a front elevational view of the sensor of the apparatus shown in FIGS. 1 to 3.
Figure 4B:
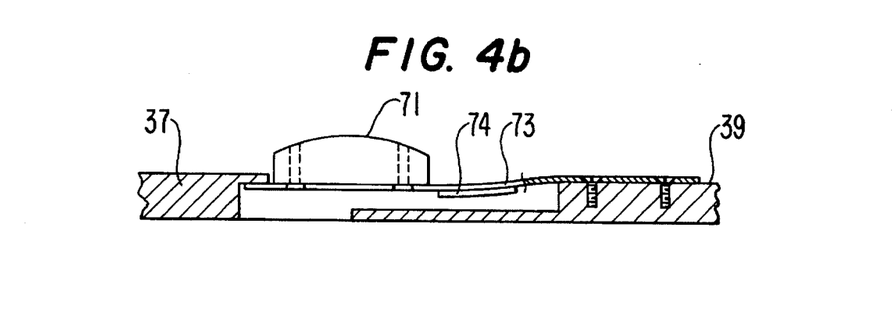
Figure 5:
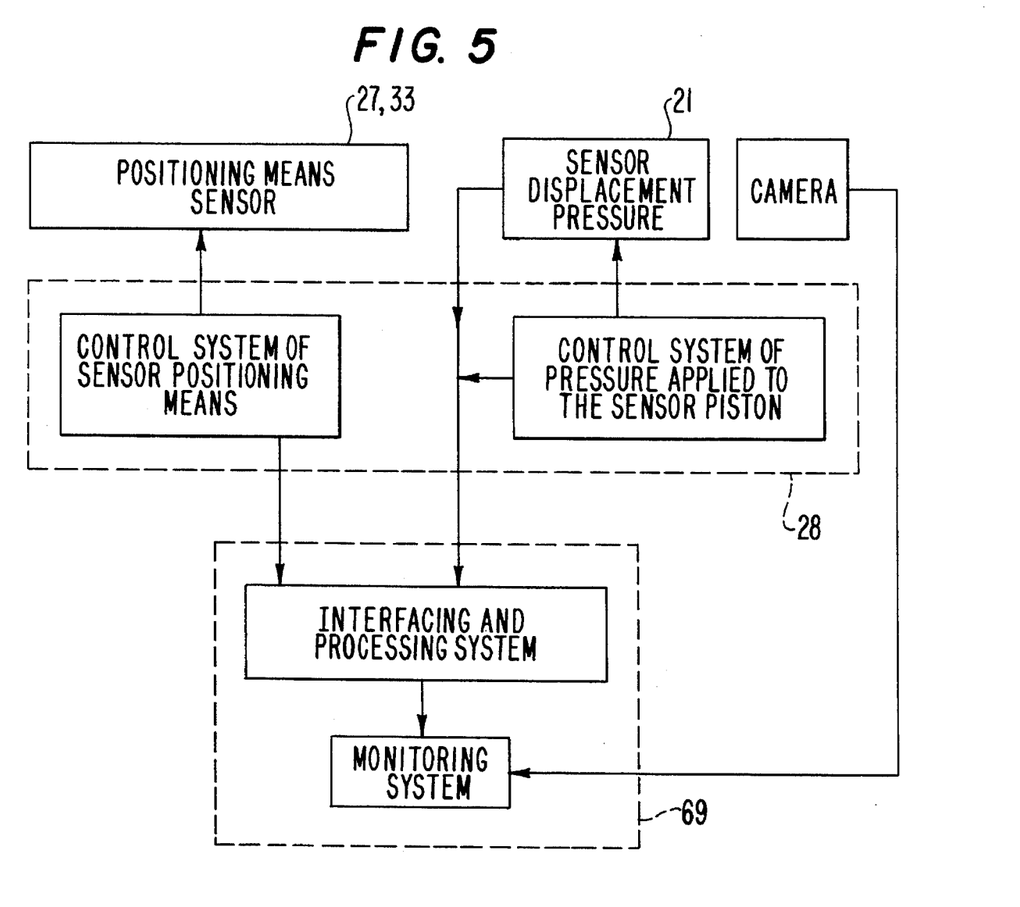
FIG. 5 is a block diagram of the control circuit of the apparatus.

Referring now more particularly to FIGS. 2 and 4, the sensor 21 according to the invention comprises a body 37 consisting of a thin metal plate whose thickness "h" is constant and chosen to make the sensor insertable into the air-gap. The thickness "h" is preferably less than or equal to 10 mm.

The thin body 37 is fixed to the extremity of the last link 24 of the chain. It has one face 39 formed with a recess 41 preferably cylindrical, which acts as a piston cylinder in which a piston 43 is movably mounted. The piston has a head 45 of the same diameter as the recess 41 and a short coaxial rod 47 provided or not with a tiltable tip 48 mounted on a cylindrical knuckle 49 (see FIG. 2). This tiltable tip 48 adjusts itself to the surface of the stator wedge 13 and avoids that the exerted pressure applies a cantilever force onto this wedge.

The piston 43 is retained in the recess 41 by a retaining ring 50 fixed to the periphery of the recess by screws 51.

The piston 43 is remotely controllable by means for injecting a fluid under pressure—preferably air—in the recess 41 of the body behind the head 45 of the piston. Such injection means includes a source of compressed air (not shown), an air feed tube 53 passing in the chain, and a passage 55 made in the body of the sensor and opening into the recess 41. The purpose of such injection means is essentially to exert a pressure by means of the injected fluid such that the piston 43 is displaced in a direction transverse to the air-gap 5 when the sensor 21 is inserted into the latter, in order to cause the piston to apply a pressure against a stator wedge 13 which it faces while the sensor is backed against the rotor 1. Return means consisting of a plurality of small spring leafs 56 are provided for moving the piston 43 back into the cylinder as soon as the fluid injection is stopped.

Means not shown but well known per se are provided to measure the pressure thus exerted when the piston 43 presses against the stator wedge 13. It will be readily understood that the pressure thus exerted is proportional to the force applied to the ripple spring 11 behind the stator wedge 13.

Other means are further provided to simultaneously measure the displacement of the stator wedge 13 while the pressure is exerted. These other means actually measure the displacement of the piston 43 in its cylinder 41. For this purpose, they comprise at least one and preferably two resilient blades 57 each having a first extremity rigidly fixed by screws to the face 39 of the body 37 of the sensor, a second extremity contacting the head 45 of the piston 43 so that it moves with the latter, and a central portion. On at least one of these central portions is secured at least one and preferably two or four strain gauges 59 electrically connected by wirings 61 to measuring means (not shown). When the piston is displaced, the blades 57 which also serve as piston return means, bend and cause a change in the resistance of the wire of each gauge 59. The latter then gives a signal proportional to the displacement 43 and, hence, to the displacement of the stator wedge 13 when the latter is pressed.

According to a preferred embodiment of the invention particularly useful when the positioning of the sensor is done manually, a visualization system can be provided for allowing the operator to locate each stator wedge and thus position the sensor 21 with respect to the same. This system may comprise a micro-camera or a fibroscope like those used for endoscopy. In the latter case, the optic fiber 62 of the visualization system has an extremity serving as a spectacle, which is attached to the sensor 21 in a cavity 63 provided for such purpose in the body 37 (see FIG. 4), transversely of the piston 43. The extremity of the fiber 62 which acts as a spectacle, is remotely adjustable as is known, and faces a 45° mirror 65 which is incorporated in the cavity 63. Advantageously, illumination means 67 in addition to those of the visualization system can be incorporated into the body 37 of the sensor to facilitate the localisation of the stator wedge whose tightness is to be evaluated with the use of the fiber 61 and mirror 65.

In practice, the above apparatus, once installed, may be used as follows:

(a) the sensor 21 is inserted into the air-gap 5;

(b) the sensor is positioned in front of the stator wedge 13 where a tightness evaluation is required, such that the piston 43 faces the stator wedge;

(c) a constant or variable pressure is exerted by compressed air or any other fluid to displace the piston 43 of the sensor and bring it to contact first and then press against the stator wedge 13 while the sensor is backed against the rotor 1;

(d) the pressure thus exerted is measured, such pressure being proportional to the force applied to the ripple spring 11 (or rubber bead) by the stator wedge;

(e) simultaneously, the displacement of the stator wedge is measured by the strain gauges 59 fixed to the resilient blades 57 as the pressure is being exerted; and (f) the tightness of the spring is determined by the force and displacement thus measured using any one of the methods mentioned hereinabove and described greater in detail hereafter.

This last determination can be made by an electronic conditioning system and a computer processing system 69 incorporating or not a video screen.

Before carrying out steps (b) to (f), one may advantageously proceed to a precalibration of the sensor 21 by positioning the latter in the air-gap 5 between rigid surfaces of the rotor 1 and the stator 3 and by measuring the displacement of the piston as a function of the working pressures that may be used. In step (f), one may then subtract the value of the displacement thus measured from the measured value of the same displacement when pressure is exerted on the wedge 13.

To avoid having to proceed to such a precalibration and, more importantly, to take into account any variation in the width of the air-gap, the apparatus may further incorporate a set of shoes 71, which are mounted onto the free ends of resilient blades 73 that fixed into cavities provided for this purpose in the body 37, and are provided with strain gages 74 connected by suitable wirings 75 to the sensor. These shoes 71 are positioned to face, contact and slide onto the surface of the core of the stator 3, on both sides of the slot where the measurement is carried out. Any variation in the width of the air gap will deflect the blades 73 and will be measured by means of the strain gauges 74 mounted on the central portion of these blades. Then, the measured values will be subtracted from the measured values of the displacement of the piston so as to obtain the actual value of displacement of the stator wedge and of the ripple spring.

In practice, the determination step (f) may be carried out in three ways.

Figure 6:
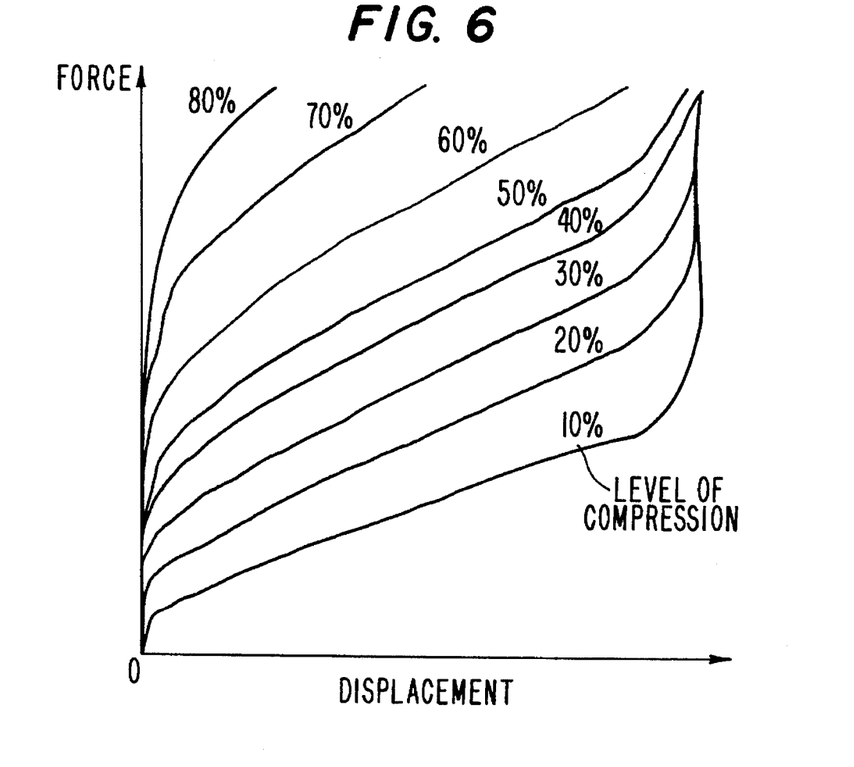
FIG. 6 is a graphic representation showing the force applied by the sensor as a function of the displacement measured at different levels of compression.
Figure 7:
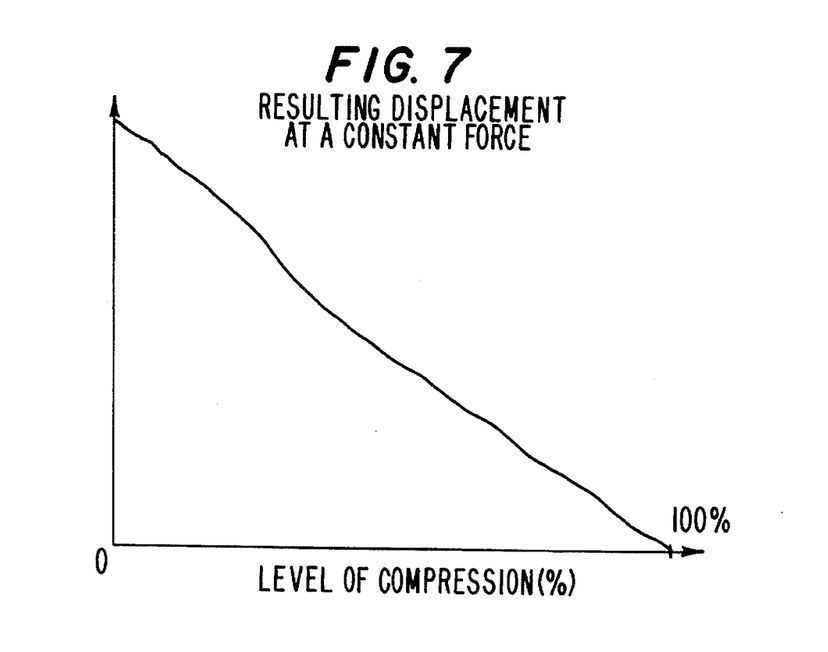
FIG. 7 is a graphic representation showing the displacement generated by a given force at different levels of compression.

After appropriate precalibration, one may draw up in a laboratory, reference curves giving the value of the force as a function of the displacement for the resilient holding means that is tested, at different initial levels of compression. A calibration curve giving the value of the displacement caused by a force F as a function of the initial level of compression may then be traced (see FIG. 6). The level of compression or tightness of the stator wedge under test may then be deducted directly from the measure of the displacement caused by a given force F applied to the stator wedge, by using the calibration curve. This is illustrated in FIG. 7. Thus according to this method, a constant force is exerted and the resulting displacement is measured.

Figure 8:
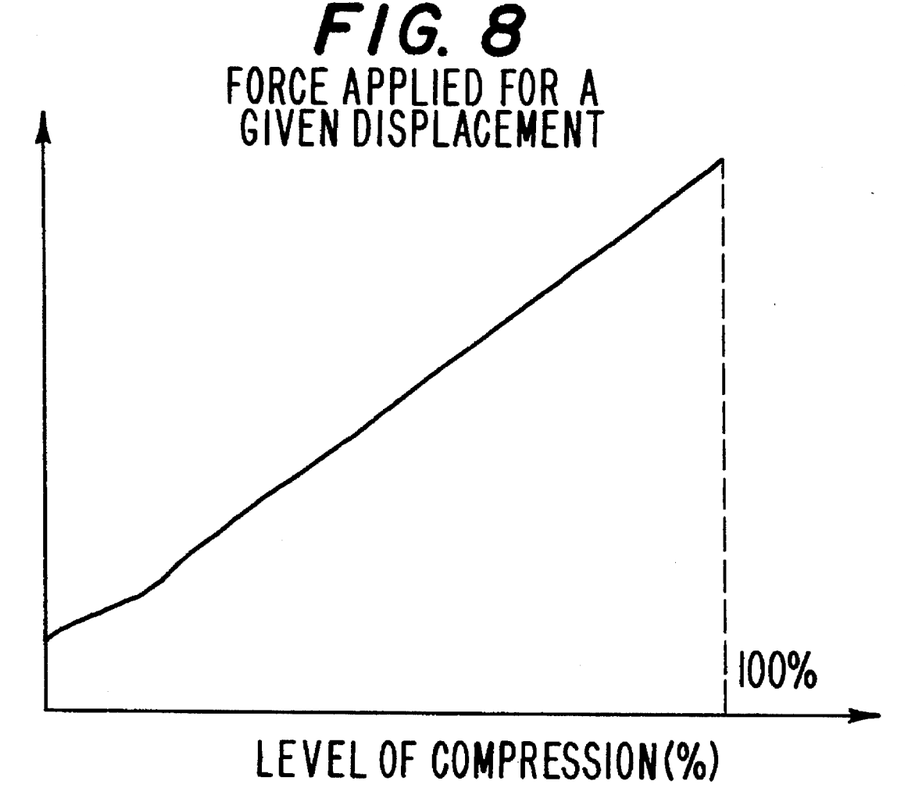
FIG. 8 is a gripline representation showing the force required for obtaining a same predetermined displacement at different levels of compression.

The evaluation of the tightness of the stator wedges may also be carried out by setting a given length of displacement and measuring the force that must be exerted to achieve this displacement (see FIG. 8).

The evaluation of the tightness of a stator wedge may further be carried out by evaluating the ordinate at the origin of the curves giving the force as a function of the displacement, which corresponds to the actual force applied by the spring on the stator coils. In this case, one may set a threshold value corresponding to an ordinate which itself corresponds to a requested level of compression, and then check whether the measured value of the exerted force reaches or not this threshold. This ordinate at the origin can be obtained by computer processing of the curves.

As previously mentioned, the whole may be automated.

It is to be understood that modifications may be made to the apparatus described herein by way of example only, without departing from the scope of the invention as defined in the appended claims. Thus, for example, the apparatus according to the invention could also include at least one spacing plate 77 fixable to the body of the sensor on the face of it that is opposite to the piston, so as to increase the thickness of the sensor and thus make it useful in wider air-gaps (see FIG. 1).

We claim:

1. A method for quantitatively evaluating the stator wedge tightness of an alternator comprising a rotor and a stator together defining an air-gap of a given width, said stator being provided with radial slots having outlets in communication with the air-gap and in each of which is retained at least one stator coil by means of a resilient holding means which abuts against stator wedges slidably inserted into a set of symmetrical grooves provided therefor in the stator at the outlet of each slot, said method comprising the steps of:

(a) inserting into the air-gap a sensor provided with a mobile element capable of being displaced in a transverse direction relative to said air-gap by the effect of a pressure exerted by a fluid;

(b) positioning the sensor in front of the stator wedge the tightness of which is to be evaluated in such a manner that said mobile element faces said stator wedge;

(c) exerting pressure on said fluid to displace the mobile element of the sensor and to cause this element to contact first and then press against said stator wedge while said sensor is backed against said rotor;

(d) measuring the so-exerted pressure, said pressure being proportional to the force applied to said resilient holding means behind the stator wedge;

(e) measuring the displacement of the stator wedge as the pressure is exerted; and (f) determining the tightness of the stator wedge from the so measured force and displacement;

wherein:

(g) the sensor that is used, has a body in the shape of a thin plate having a thickness slightly smaller than the width of said air-gap, said plate having one face provided with a recess acting as a cylinder in which is mounted a piston acting as said mobile element, said piston being remotely actuatable by injection of said pressurized fluid into said cylinder; and h) the measurement of the displacement of the wedge is achieved by measuring the displacement of the piston in said cylinder by means of at least one resilient blade having a first extremity rigidly fixed to the body of the device; a second extremity mounted on the piston so as to be displaced with said piston, and a central portion on which is attached at least one strain gauge giving a signal proportional to the displacement of said piston and thence to the displacement of said stator wedge when the latter is displaced.

2. The method of claim 1, wherein, before carrying out steps (b) to (f), said sensor is positioned in the air-gap between rigid surfaces of the rotor and the stator and the value of the displacement of the piston corresponding to the working pressures is measured, and wherein, in step (f), the so measured displacement value is subtracted from the measured value of the same displacement when pressure is exerted on the stator wedge.

3. The method of claim 1, wherein, when step (b) is completed, any variation in the width of the air gap is measured by at least one strain gauge mounted on a resilient blade having one end fixed to the body of the sensor and another free end provided with a shoe that contacts and slides onto a rigid surface of the stator, and wherein, in step (f), the so-measured variation is substracted from the measured value of the displacement in order to obtain the actual value of the displacement of the stator wedge when pressure is exerted onto said stator wedge.

4. The method of claim 1, wherein step (b) is carried out by mechanical means devised to displace said sensor along each radial slot.

5. The method according to claim 4, wherein said mechanical means are controlled to automatically displace the sensor along each radial slot so that said sensor is positioned in front of each successive stator wedge slidably inserted into the grooves made in said radial slot.

6. The method of claim 5, wherein said mechanical means are also devised to displace the sensor from one given slot to at least one other adjacent slot.

7. The method of claim 4, wherein said mechanical means are manually controlled and wherein said sensor is provided with a optic fiber visualization system allowing an operator to locate each stator wedge and to position the sensor relative to said stator wedge.

8. The method of claim 1, wherein the fluid used is compressed air.

9. The method of claim 1, wherein step (f) consists in determining the percentage of compression of the resilient holding means by exerting a constant pressure during step (c) and by measuring the displacement that is so-obtained.

10. The method of claim 1, wherein step (f) consists in determining the percentage of compression of the resilient holding means by setting a given displacement and by measuring the pressure that is required to achieve such a displacement.

11. The method of claim 1, wherein step (f) consists in determining the percentage of compression of the resilient holding means by setting a threshold value corresponding to an ordinate of the curves giving the force as a function of the displacement, such an ordinate corresponding to a requested equivalent percentage of compression, and then by verifying if the measured value of the force that is exerted has reached or not this threshold value.

12. An apparatus for quantitatively evaluating the stator wedge tightness of an alternator comprising a rotor and a stator together defining an air-gap of a given width, said stator being provided with radial slots having outlets in open communication with said air-gap and in each of which is retained at least one stator coil by means of resilient holding means abutting stator wedges slidably inserted into a set of symmetric grooves provided therefor in the stator at the outlet of each slot, said apparatus comprising:

(a) a sensor dimensioned so as to be insertable into said air-gap, said sensor being provided with a mobile element capable of displacement in a direction transverse to said air-gap by the effect of a pressure exerted by a fluid;

(b) means for positioning said sensor in front of a stator wedge where the tightness evaluation is required, thereby allowing said mobile element of said sensor to face said stator wedge;

(c) means for exerting pressure by means of a fluid to displace the mobile element of said sensor and cause it to press against said stator wedge while said sensor is backed against the rotor;

(d) means for measuring the pressure that is exerted when the mobile element presses against said stator wedge, such pressure being proportional to the force applied to said resilient holding means behind said stator wedge;

(e) means for measuring the displacement of the stator wedge as the pressure is being exerted; and (f) means for evaluating the tightness of the stator wedge by means of the so-measured force and displacement; wherein:

(g) said sensor has a body in the shape of a thin plate having a thickness slightly smaller than the width of said air-gap, said body having one face provided with a recess acting as a cylinder in which is mounted a piston acting as said mobile element, said piston being remotely controlled by injection of said fluid under pressure into said cylinder; and (h) said means for measuring the displacement of a stator wedge consists of means for measuring the displacement of the piston in said cylinder, said piston deplacement measuring means consisting of at least one resilient blade having a first extremity rigidly fixed to the body of the sensor, a second extremity mounted on the piston so as to be displaced therewith, and a central portion on which is attached at least one strain gauge giving a signal proportional to the displacement of said piston and thence to the displacement of the stator wedge when the latter is displaced.

13. The apparatus of claim 12, wherein said means (b) comprises a first mechanical system allowing displacement of said sensor along each radial slot.

14. The apparatus of claim 13, wherein said first mechanical system is operated by a motor which is controlled by a control device for automatically displacing said sensor along each radial slot, whereby the sensor can be positioned in front of each successive stator wedge slidably inserted in the grooves of said radial slot.

15. The apparatus of claim 14, wherein the first mechanical system includes a chain rolled on a drum driven by the motor, said chain having a free end unrollable into the air-gap and to which the sensor is attached.

16. The apparatus of claim 14, wherein said means (b) also comprises a second mechanical system allowing displacement of the sensor from a given slot to at least one other adjacent slot.

17. The apparatus of claim 16, wherein said second mechanical system includes a carriage on which the first mechanical system is mounted and means to displace the carriage in translation.

18. The apparatus of claim 14, wherein the first mechanical system is manually controlled and the sensor is provided with a fiber visualization system allowing an operator to locate each stator wedge and to position the sensor relative to the same.

19. The apparatus of claim 18, wherein said first mechanical system includes a chain rolled on a drum driven by a motor, the chain having a free end unrollable into said air-gap and to which is fixed the sensor.

20. The apparatus of claim 18, wherein visualization system comprises an optic fiber having an extremity adapted to serve as a spectacle and which is fixed to said sensor.

21. The apparatus of claim 20, wherein the extremity of the optic fiber serving as a spectacle extends transversely to the piston in a cavity provided in the body of the sensor, and faces a mirror incorporated in said cavity, and wherein lighting means are provided at the level of the said sensor to facilitate the visualization of a stator wedge the tightness of which is to be evaluated, with said optic fiber.

22. The apparatus of claim 12, wherein the apparatus further comprises at least one spacing plate attachable to the body of said sensor opposite to the face where the piston is mounted, whereby the thickness of the sensor is increased, allowing use of the sensor in an air-gap of larger width.

23. The apparatus of claim 12, wherein said means (f) includes an electronic conditioning system and a computer processing system.

24. The apparatus of claim 23, wherein said injected fluid is compressed air and the apparatus is in the form of a portable kit.

* * * * *